United States Patent
Miyazawa et al.

(10) Patent No.: US 8,945,697 B2
(45) Date of Patent: Feb. 3, 2015

(54) OPTICAL RECORDING MEDIUM

(75) Inventors: Fuyuki Miyazawa, Tokyo (JP); Wakaaki Murai, Tokyo (JP)

(73) Assignee: Taiyo Yuden Co., Ltd., Tokyo (JP)

(*) Notice: Subject to any disclaimer, the term of this patent is extended or adjusted under 35 U.S.C. 154(b) by 0 days.

(21) Appl. No.: 14/001,200

(22) PCT Filed: Feb. 9, 2012

(86) PCT No.: PCT/JP2012/052927
§ 371 (c)(1), (2), (4) Date: Sep. 6, 2013

(87) PCT Pub. No.: WO2012/114884
PCT Pub. Date: Aug. 30, 2012

(65) Prior Publication Data
US 2014/0030467 A1    Jan. 30, 2014

(30) Foreign Application Priority Data
Feb. 24, 2011    (JP) .................. 2011-038674

(51) Int. Cl.
*G11B 7/24* (2013.01)
*G11B 7/2467* (2013.01)
*G11B 7/24056* (2013.01)
*G11B 7/249* (2013.01)

(52) U.S. Cl.
CPC .......... *G11B 7/2467* (2013.01); *G11B 7/24056* (2013.01); *G11B 7/249* (2013.01)
USPC ...................... 428/64.1; 428/64.4; 430/270.14

(58) Field of Classification Search
CPC ....... G11B 7/246; G11B 7/2467; G11B 7/254
USPC ..................................... 428/64.4; 430/270.14
See application file for complete search history.

(56) References Cited

U.S. PATENT DOCUMENTS

| 8,722,315 B2* | 5/2014 | Ito ................................ 430/321 |
| 2009/0263611 A1 | 10/2009 | Miyazawa et al. |
| 2010/0002569 A1 | 1/2010 | Nagase et al. |

FOREIGN PATENT DOCUMENTS

| JP | 2007-045147 A | 2/2007 |
| JP | 2008-071439 A | 3/2008 |
| JP | 2009-016001 A | 1/2009 |
| JP | 2009-026379 A | 2/2009 |
| JP | 2010-015612 A | 1/2010 |
| WO | 2012/011260 A1 | 1/2012 |

OTHER PUBLICATIONS

International Search Report from the International Bureau of WIPO for International Application No. PCT/JP2012/052927 dated May 22, 2012 (2 pages).

* cited by examiner

*Primary Examiner* — Elizabeth Mulvaney
(74) *Attorney, Agent, or Firm* — Saliwanchik, Lloyd & Eisenschenk

(57) ABSTRACT

An optical recording medium is provided having a recording layer that absorbs light with a wavelength of 350 nm to 500 nm, the optical recording medium having good recording playback properties even when the ambient temperature changes, and allowing playback distortion to be controlled even when stored in a high temperature environment. A write-once type optical recording medium including: a substrate; a reflective layer that reflects light with a wavelength of 350 nm to 500 nm on the substrate; a recording layer that absorbs light with a wavelength of 350 nm to 500 nm; and a light transmission layer with a single-layer construction that transmits light with a wavelength of 350 nm to 500 nm, the light transmission layer having a modulus of elasticity at 75° C. that ranges from 50 MPa to less than 170 MPa.

4 Claims, 1 Drawing Sheet

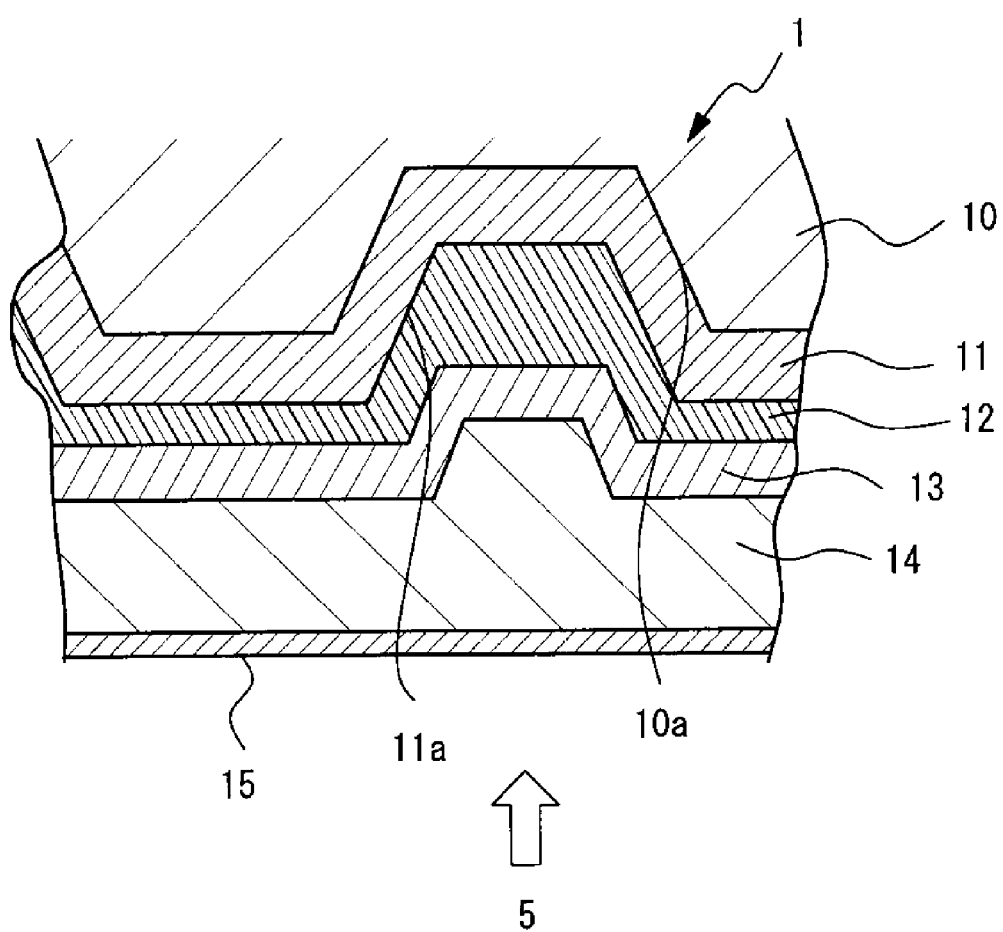

OPTICAL RECORDING MEDIUM

CROSS-REFERENCE TO A RELATED APPLICATIONS

This application is a U.S. national phase application filed under 35 U.S.C. §371 of International Application PCT/JP2012/052927, filed on Feb. 9, 2012, designating the United States, which claims priority from JP 2011-038674, filed on Feb. 24, 2011, which are hereby incorporated herein by reference in their entirety.

TECHNICAL FIELD

The present invention relates to a write-once type optical recording medium including a substrate on which at least a reflective layer that reflects light with a wavelength of 350 nm to 500 nm, a recording layer formed by an organic dye that absorbs light with a wavelength of 350 nm to 500 nm, and a light transmission layer that transmits light with a wavelength of 350 nm to 500 nm are laminated.

BACKGROUND ART

In recent years, in order to increase a data storage capacity, an optical recording medium, especially a blue-ray disc, has been developed and practically used that converges a laser beam with a wavelength of 405 nm using an objective lend having a numerical aperture of 0.85 so that data is stored.

Such an optical recording medium has a support substrate having a thickness of 1.1 mm on which at least a recording layer and a light transmission layer that transmits a laser beam having a thickness of about 100 μm are laminated.

Thus, the support substrate and the light transmission layer have different thicknesses, and are generally made of materials having different physical properties such as elastic modulus. Therefore, the optical recording medium is undesirably easily warped by a change of an ambient temperature etc.

Japanese Patent Application Laid-open No. 2008-071439 proposes that a light transmission layer is formed by a photo-curable resin having a specific storage elastic modulus at 25° C. in order to prevent degradation of mechanical properties, especially a radial tilt properties, of the optical recording medium even when the optical recording medium is stored for prolonged period.

Japanese Patent Application Laid-open No. 2009-026379 proposes that a write-once type optical recording medium has a light transmission layer having a storage elastic modulus at 5° C. of 100 MPa or less and a storage elastic modulus at 55° C. of 100 MPa or less and having a ratio of the storage elastic modulus at 5° C. and the storage elastic modulus at 55° C. of 10 or less; and a recording layer formed by an organic dye in order to prevent a decrease in record and reproduction properties even when the optical recording medium is stored for prolonged period.

SUMMARY OF INVENTION

Japanese Patent Application Laid-open No. 2008-071439 specifies only the storage elastic modulus of the photo-curable resin at 25° C. When data is stored on the optical recording medium and the data stored on the optical recording medium is reproduced, the ambient temperature within the information recording and reproducing apparatus to which the optical recording medium is set is high—far exceeding 25° C. Accordingly, it is impossible to prevent warping of the optical recording medium only by specifying the storage elastic modulus of the photo-curing resin at 25° C. when the ambient temperature is changed.

On the other hand, as disclosed in Japanese Patent Application Laid-open No. 2009-026379, when the light transmission layer has the storage elastic modulus at 5° C. of 100 MPa or less and the storage elastic modulus at 55° C. of 100 MPa or less, the light transmission layer is too soft, and the surface of the light transmission layer is easily scratched. In practice, the light transmission layer should have a two-layered configuration, i.e., an upper layer having high elastic modulus and a lower layer having low elastic modulus. However, when the light transmission layer has the two-layered configuration, the number of the layers in the optical recording layer undesirably increases, and the manufacturing costs of the optical recording medium undesirably increases.

Accordingly, an object of the present invention is to provide a write-once type optical recording medium including a substrate on which at least a reflective layer that reflects light with a wavelength of 350 nm to 500 nm, a recording layer formed by an organic dye that absorbs light with a wavelength of 350 nm to 500 nm, and a single-layered light transmission layer that transmits light with a wavelength of 350 nm to 500 nm are laminated, that has good recording and reproducing properties even if an ambient temperature is changed and is not warped even if the recording medium is stored in a high temperature environment.

In order to achieve the object of the present invention, the present inventors have intensively studied, and has found when an optical recording medium has a recording layer formed by an organic dye that absorbs light with a wavelength of 350 nm to 500 nm and a single-layered light transmission layer formed so that elastic modulus is 50 MPa or more and less than 170 MPa at 75° C., the optical recording medium has good recording and reproducing characteristics even if an ambient temperature is changed and is prevented from warping even if it is stored in a high temperature environment.

The present invention is based on such discoveries, and the object of the present invention is achieved by a write-once type optical recording medium including a substrate on which at least a reflective layer that reflects light with a wavelength of 350 nm to 500 nm, a recording layer formed by an organic dye that absorbs light with a wavelength of 350 nm to 500 nm, and a single-layered light transmission layer that transmits light with a wavelength of 350 nm to 500 nm are laminated.

In the present invention, the single-layered light transmission layer is formed by coating the photocurable resin to form a coated film, irradiating a light and curing the coated film. The photocurable resin preferably has elastic modulus of 51 MPa or more and 154 MPa or less at 75° C. after curing.

In the present invention, as the photocurable resin used for forming the single-layered light transmission layer, an ultraviolet curable resin which is cured by irradiating ultraviolet rays is preferably used.

In the present invention, the recording layer is preferably formed by an azo metal complex dye represented by the following general formula (1).

[Chemical formula 1]

General formula (1)

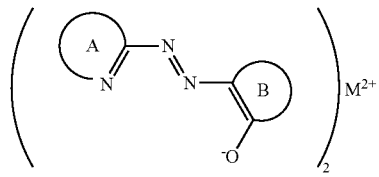

In the general formula (1), M is a divalent metal selected from Group 7A, Group 8, Group 1B and Group 2B, and is preferably nickel, cobalt, copper, zinc, manganese and iron; A is a nitrogen-containing aromatic heterocyclic ring; and B has a structure having a fused ring of a hydrocarbon ring or a heterocyclic ring of a saturated or unsaturated five-membered ring (pentagonal) to seven-membered (hexagonal) ring.

EFFECTS OF THE INVENTION

According to the present invention, it is possible to provide a write-once type optical recording medium including a substrate on which at least a reflective layer that reflects light with a wavelength of 350 nm to 500 nm, a recording layer formed by an organic dye that absorbs light with a wavelength of 350 nm to 500 nm, and a single-layered light transmission layer that transmits light with a wavelength of 350 nm to 500 nm are laminated, that has good recording and reproducing characteristics even if an ambient temperature is changed and is not warped even if the recording medium is stored in a high temperature environment.

BRIEF DESCRIPTION OF THE DRAWINGS

FIG. 1 is a schematic longitudinal sectional view of an optical recording medium according to a preferable embodiment of the present invention.

MODES FOR CARRYING OUT THE INVENTION

FIG. 1 is a schematic longitudinal sectional view of an optical recording medium according to a preferable embodiment of the present invention.

As shown in FIG. 1, the optical recording medium 1 according to the embodiment includes a substrate 10 and, on the substrate 10 in the following order, a reflective layer 11, a recording layer 12, a protective layer 13, a light transmission layer 14, and a hard coat layer 15 that protects the light transmission layer 14 and prevents the light transmission layer 14 from scratching.

In the embodiment, the optical recording medium 1 is configured such that a laser beam 5 with a wavelength of 405 nm records information and reproduces the information recorded. A recording laser beam 5 for recording data on the recording layer 12 of the optical recording medium 1 and a reproducing laser beam 5 for reproducing the data recorded on the recording layer 12 are configured to be irradiated from a hard coat layer 15 side to the optical recording medium 1 as shown by an arrow in FIG. 1.

Although not shown in FIG. 1, the write-once type optical recording medium 1 according to the embodiment has a circular plate shape, and a center hole is formed at a center part.

The substrate 10 has the circular plate shape, functions as a support for assuring a mechanical strength required by the optical recording medium 1, and has a thickness of about 1.1 mm and a diameter of 120 mm.

A material for forming the substrate 10 is not especially limited as long as the mechanical strength required by the optical recording medium 1 is ensured. The substrate 10 may be formed of a metal such as aluminum, glass, ceramics, a resin and the like. Among them, the resin, in particular, a thermoplastic resin is preferably used from the standpoint of formability, moisture resistance, dimensional stability and costs. Examples of the resin for forming the substrate 10 include polycarbonate resins; acrylic resins such as polymethyl methacrylate; vinyl chloride-based resins such as polyvinyl chloride and a vinyl chloride copolymer; epoxy resins; amorphous polyolefin resins; polyester resins and the like. Among them, the polycarbonate resins are especially preferable.

As shown in FIG. 1, a spiral guide groove 10a is formed on a surface of the substrate 10. The spiral guide groove 10a can be formed by injection molding with a mold on which a stamper is set. The guide groove 10a is formed in a pitch of 0.35 μm or 0.32 μm. A width of the guide groove 10a is set to 160 nm to 200 nm. Preferably, a depth of the guide groove 10a is 32 nm to 35 nm. Here, the width of the guide groove 10a is represented by a half value width at a position where the depth of the guide groove 10a is ½.

As shown in FIG. 1, the reflective layer 11 is formed by sputtering etc. on a surface of the substrate 10 at the side where the spiral guide groove 10a is formed. The reflective layer 11 has a function to reflect the laser beam irradiated to the optical recording medium 1 and transmitted through the recording layer 12 to the recording layer 12, and is generally formed of a metal having high reflectance such as an Ag alloy and an Al alloy. According to the embodiment, the reflective layer 11 is formed of the Ag alloy. The reflective layer 11 is preferably formed to have a thickness of 50 nm to 70 nm.

As the reflective layer 11 is formed on a surface of the substrate 10 at the side where the spiral guide groove 10a is formed, a guide groove 11a is also formed on the reflective layer 11. A width of the guide groove 11a formed on the reflective layer 11 is 150 nm to 190 nm. Preferably, a depth of the guide groove 11a is 32 nm to 35 nm.

The recording layer 12 is formed on the surface of the reflective layer 11, and contains the organic dye. The recording layer 12 is formed by dissolving the organic dye into 2,2,3,3-tetrafluoro-1-propanol (TFP), and coating and drying the resultant solution on the surface of the reflective layer 11 using a spin coating method.

In the present invention, the organic dye preferably used for forming the recording layer 12 is an azo metal complex dye represented by the above-described general formula (1).

The protective layer 13 is formed on the surface of the recording layer 12.

The protective layer 13 is for preventing a diffusion of the organic dye contained in the recording layer 12 over the light transmission layer 14 when the light transmission layer 14 is formed, and also for preventing a miscible phenomenon that a solvent of a photocurable resin used when the light transmission layer 14 is formed is permeated into the recording layer 12.

A material for forming the protective layer 13 is not especially limited as long as it is a transparent dielectric material. Examples include oxides such as silicon oxide (particularly preferably, silicon dioxide), zinc oxide, cerium oxide, zirconium oxide, yttrium oxide, indium oxide-tin oxide (ITO); sulfides such as zinc sulfide and yttrium sulfide; nitrides such as silicon nitride; and a mixture of the oxides and a sulfuric compound. In the embodiment, the protective layer 13 is formed of zinc sulfide-silicon dioxide ($ZnS-SiO_2$) by sputtering etc.

On the surface of the protective layer 13, the light transmission layer 14 is formed.

The light transmission layer 14 is formed by coating the surface of the protective layer 13 with the photocurable resin, which is cured by irradiating ultraviolet rays or radiation, by the spin coating method to form a coated film, and by irradiating the coated film with ultraviolet rays or radiation to cure the coated film.

According to the embodiment, a combined thickness of the light transmission layer 14 and the hard coat layer 15 formed on the light transmission layer 14 is set to 100 μm.

In the embodiment, the light transmission layer 14 is formed by the photocurable resin having elastic modulus of 50 MPa or more and less than 170 MPa at 75° C. after curing, preferably the photocurable resin having elastic modulus of 51 MPa or more and 154 MPa or less at 75° C. after curing.

According to the studies by the present inventors, it is found that when the optical recording medium 1 has the recording layer 12 formed by the organic dye that absorbs the light with a wavelength of 350 nm to 500 nm and the single-layered light transmission layer 14 formed so that the elastic modulus is 50 MPa or more and less than 170 MPa at 75° C., the optical recording medium 1 has good recording and reproducing characteristics even if an ambient temperature is changed and is prevented from warping even if it is stored in a high temperature environment.

As shown in FIG. 1, the hard coat layer 15 is formed on the surface of the light transmission layer 14 in order to physically protect the light transmission layer 14 and prevent the light transmission layer 14 from damaging.

A material for forming the hard coat layer 15 is not especially limited, but may be preferably excellent in transparency and abrasion resistance. The hard coat layer 15 is preferably formed by coating a resin composition including an ultraviolet curable resin to which inorganic particles are added over the surface of the light transmission layer 14 by the spin coating method.

Preferably, the hard coat layer 15 has a thickness of 1 μm to 5 μm.

When information is recorded on the optical recording medium configured as described above according to the embodiment, the laser beam 5 with a wavelength of 405 nm and having a recording power Pw is irradiated from the hard coat layer 15 side.

The laser beam 5 is transmitted through the hard coat layer 15, the light transmission layer 14 and the protective layer 13 and is incident on the recording layer 12; or is transmitted through the recording layer 12, is reflected by the reflective layer 11, and is incident on the recording layer 12.

As a result, the organic dye contained in a region of the recording layer 12 irradiated with the laser beam 5 is thermally decomposed. The reflectance on the region is increased. In this way, the recoding pit is formed and the data is written into the optical recording medium 1.

On the other hand, when the information recorded on the recording layer 12 of the optical recording medium 1 is reproduced, the information recorded on the recording layer 12 is read-out by irradiating the optical recording medium 1 with the laser beam 5 with a wavelength of 405 nm and having a reproducing power Pr from the hard coat layer 15 side, and photoelectrically detecting the light transmitted through the recording layer 12 and reflected by the reflective layer 11.

In the embodiment, as the single-layered light transmission layer 14 is formed by the photocurable resin having elastic modulus of 50 MPa or more and less than 170 MPa at 75° C. after curing, preferably the photocurable resin having elastic modulus of 51 MPa or more and 154 MPa or less at 75° C. after curing, the optical recording medium 1 has good recording and reproducing characteristics even if an ambient temperature is changed and is prevented from warping even if it is stored in a high temperature environment. For measurement of elasticity at 75° C., a dynamic viscoelasticity measuring apparatus RMAIII manufactured by TA Instruments was used. A test specimen was provided by coating a photocurable resin on a disc at a thickness of 100 μm, curing it, peeling the resin from the disc, and cutting into a size of 5 mm×50 mm.

EXAMPLES

Examples and Comparative Examples will be given below to further illustrate the effect of the present invention.

Example 1

A circular plate shaped substrate was injection molded from a polycarbonate resin having an outer diameter of 120 mm and a thickness of 1.1 mm on which a spiral guide groove was formed at a pitch of 0.32 μm.

An Ag alloy reflective layer was formed on a surface of the substrate at the side where the guide groove is formed, and a track corresponding to the guide groove having a depth of 33 nm and a width of 175 nm was formed at a surface of the reflective layer.

Next, the azo metal complex including nickel as the divalent metal and having a triazol structure in the nitrogen-containing aromatic heterocyclic ring represented by the following structural formula (10) was dissolved into 2,2,3,3-tetrafluoro-1-propanol (TFP). The resultant solution was coated over the surface of the reflective layer at 80° C. for 30 minutes by the spin coating to form the recording layer having the thickness of 40 nm.

[Chemical formula 2]

Structural formula (10)

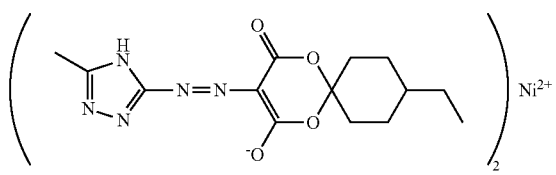

In addition, ZnS—SiO$_2$ was sputtered on the surface of the recording layer to form the protective layer having a thickness of 17 nm.

Next, an ultraviolet curable resin having elastic modulus of 12 MPa at 75° C. after curing was coated over the surface of the protective layer by the spin coating method to form a coated film. The coated film was irradiated with ultraviolet rays and cured to form the light transmission layer having a thickness of 97 μm.

In addition, a resin composition including an ultraviolet curable resin to which inorganic particles were added was coated over the surface of the light transmission layer by the spin coating method to form a coated film. The coated film was irradiated with ultraviolet rays, and cured, thereby forming a hard coat layer having a thickness of 3 μm.

In this way, an optical recording medium sample No. 1 was prepared.

Further, an optical recording medium sample No. 2 was prepared similar to Example 1 except that an ultraviolet curable resin having elastic modulus of 30 MPa at 75° C. after curing was used to from the light transmission layer.

Next, an optical recording medium sample No. 3 was prepared similar to Example 1 except that an ultraviolet curable resin having elastic modulus of 34 MPa at 75° C. after curing was used to from the light transmission layer.

Further, an optical recording medium sample No. 4 was prepared similar to Example 1 except that an ultraviolet curable resin having elastic modulus of 51 MPa at 75° C. after curing was used to from the light transmission layer.

Next, an optical recording medium sample No. 5 was prepared similar to Example 1 except that an ultraviolet curable resin having elastic modulus of 69 MPa at 75° C. after curing was used to from the light transmission layer.

Further, an optical recording medium sample No. 6 was prepared similar to Example 1 except that an ultraviolet curable resin having elastic modulus of 83 MPa at 75° C. after curing was used to from the light transmission layer.

Also, an optical recording medium sample No. 7 was prepared similar to Example 1 except that an ultraviolet curable resin having elastic modulus of 154 MPa at 75° C. after curing was used to from the light transmission layer.

Further, an optical recording medium sample No. 8 was prepared similar to Example 1 except that an ultraviolet curable resin having elastic modulus of 170 MPa at 75° C. after curing was used to from the light transmission layer.

The ambient temperature was set to 55° C., and a change in information recording and reproducing characteristics at high temperature was measured for the thus-obtained optical recording medium samples Nos. 1 to 8.

Specifically, each of the optical recording medium samples Nos. 1 to 8 was sequentially set at a data recording/reproducing apparatus "ODU-1000" (trade name) manufactured by Pulstec Industrial Co., Ltd. The surface of the hard coat layer in each sample was irradiated with a recording laser beam at the ambient temperature of 55° C. to record the data on the recording layer. In this case, the recording power Pw of the recording laser beam was increased in a stepwise manner to a designed value P1.

Next, each sample was set at the information recording and reproducing apparatus, the hard coat layer was irradiated with the laser beam set to the reproducing power Pr, and the data recorded on the recording layer of each sample was reproduced. A recording power P2 of the recording laser beam was determined until the data couldn't be reproduced.

Based on the recording powers P1 and P2 of the laser beam thus-measured, a data reproduction limit X was determined. The data reproduction limit X is defined by the following equation, and indicates that the data cannot be reproduced. When the data reproduction limit X was 20% or more, the optical recording medium was judged as "GOOD". When the information reproduction limit X was less than 20%, the optical recording medium was judges as "NO GOOD".

$$X=(P2-P1)/P1$$

Here, when the data reproduction limit X was 20% or more, the optical recording medium was judged as "GOOD", and when the information reproduction limit X was less than 20%, the optical recording medium was judges as "NO GOOD". This is because the recording power Pw of the laser beam may be changed due to a variation in an optical recording medium performance, a variation in a data recording reproducing apparatus performance, and disturbance, when a user actually records information on the optical recording medium. If the data reproduction limit X is less than 20%, the information may not be recorded and reproduced as desired.

As a result, the data reproduction limit X of the optical recording medium sample No. 1 where the light transmission layer was formed by the ultraviolet curable resin having elastic modulus of 12 MPa at 75° C. after curing was 6.2%, the data reproduction limit X of the optical recording medium sample No. 2 where the light transmission layer was formed by the ultraviolet curable resin having elastic modulus of 30 MPa at 75° C. after curing was 14.3%, the data reproduction limit X of the optical recording medium sample No. 3 where the light transmission layer was formed by the ultraviolet curable resin having elastic modulus of 34 MPa at 75° C. after curing was 12.3%, the data reproduction limit X of the optical recording medium sample No. 4 where the light transmission layer was formed by the ultraviolet curable resin having elastic modulus of 51 MPa at 75° C. after curing was 20.0%, the data reproduction limit X of the optical recording medium sample No. 5 where the light transmission layer was formed by the ultraviolet curable resin having elastic modulus of 69 MPa at 75° C. after curing was 22.5%, the data reproduction limit X of the optical recording medium sample No. 6 where the light transmission layer was formed by the ultraviolet curable resin having elastic modulus of 83 MPa at 75° C. after curing was 31.2%, the data reproduction limit X of the optical recording medium sample No. 7 where the light transmission layer was formed by the ultraviolet curable resin having elastic modulus of 154 MPa at 75° C. after curing was 37.1%, and the data reproduction limit X of the optical recording medium sample No. 8 where the light transmission layer was formed by the ultraviolet curable resin having elastic modulus of 170 MPa at 75° C. after curing was 38.91%.

Here, although the ambient temperature was set to 55° C., a relationship between the elasticity of the ultraviolet curable resin at 75° C. and the information reproduction limit X was determined. The reason was as follows: If the ambient temperature was set to 55° C., the ambient temperature of the optical recording medium sample set inside of the information recording and reproducing apparatus was higher than 55° C. When ten optical recording medium samples were set inside of the information recording and reproducing apparatus and the data was recorded and reproduced, the ambient temperature of the optical recording medium samples was 68.2° C. to 74.7° C. It was thus reasonable to determine the elasticity of the ultraviolet curable resin at 75° C. higher than the highest temperature, i.e., 74.7° C.

Whereas the information reproduction limit X of each of the optical recording medium samples Nos. 1 to 3 where the light transmission layer was formed by the ultraviolet curable resin having elastic modulus of less than 51 MPa at 75° C. was less than 20%, the information reproduction limit X of each of the optical recording medium sample No. 4 where the light transmission layer was formed by the ultraviolet curable resin having elastic modulus of 51 MPa at 75° C., the optical recording medium sample No. 5 where the light transmission layer was formed by the ultraviolet curable resin having elastic modulus of 69 MPa at 75° C., the optical recording medium sample No. 6 where the light transmission layer was formed by the ultraviolet curable resin having elastic modulus of 83 MPa at 75° C., the optical recording medium sample No. 7 where the light transmission layer was formed by the ultraviolet curable resin having elastic modulus of 154 MPa at 75° C., and the optical recording medium sample No. 8 where the light transmission layer was formed by the ultraviolet curable resin having elastic modulus of 170 MPa at 75° C. was 20% or more. From the standpoint of the improvement of the information recording and reproducing characteristics in the high temperature environment, it reveals that the light transmission layer is preferably formed by the ultraviolet curable resin having elastic modulus of 51 MPa to 170 MPa at 75° C.

Example 2

A camber angle (deg) of each of the optical recording medium samples Nos. 1 to 8 held in the environment of 55° C. for 10 minutes was measured using an optical disc camber angle automatic measuring device "SHH-20N" manufactured by NDK corporation.

As a result, the camber angle of the optical recording medium sample No. 2 where the light transmission layer was formed by the ultraviolet curable resin having elastic modulus of 12 MPa at 75° C. after curing was 0.15 deg, the camber angle of the optical recording medium sample No. 1 where the light transmission layer was formed by the ultraviolet curable resin having elastic modulus of 30 MPa at 75° C. after curing was 0.10 deg, the camber angle of the optical recording medium sample No. 3 where the light transmission layer was formed by the ultraviolet curable resin having elastic modulus of 34 MPa at 75° C. after curing was 0.10 deg, the camber angle of the optical recording medium sample No. 4 where the light transmission layer was formed by the ultraviolet curable resin having elastic modulus of 51 MPa at 75° C. after curing was 0.05 deg, the camber angle of the optical recording medium sample No. 5 where the light transmission layer was formed by the ultraviolet curable resin having elastic modulus of 69 MPa at 75° C. after curing was 0.15 deg, the camber angle of the optical recording medium sample No. 6 where the light transmission layer was formed by the ultraviolet curable resin having elastic modulus of 83 MPa at 75° C. after curing was 0.12 deg, the camber angle of the optical recording medium sample No. 7 where the light transmission layer was formed by the ultraviolet curable resin having elastic modulus of 154 MPa at 75° C. after curing was 0.22 deg, the camber angle of the optical recording medium sample No. 8 where the light transmission layer was formed by the ultraviolet curable resin having elastic modulus of 170 MPa at 75° C. after curing was 0.35 deg.

Here, although the ambient temperature was set to 55° C., a relationship between the elasticity of the ultraviolet curable resin for forming the light transmission layer at 75° C. and the camber angle of each of the optical recording medium samples Nos. 1 to 8 was determined. The reason was as follows: As each optical recording medium sample set within the measuring device for measuring the camber angle of each optical recording medium sample was thermally affected by a circuit system etc., the ambient temperature of each optical recording medium sample was higher than 55° C. When ten optical recording medium samples were set inside of the measuring device and the camber angle of each optical recording medium sample was measured, the temperature of the measuring device was 68.2° C. to 74.7° C. It was thus reasonable to measure the elasticity of the ultraviolet curable resin and the camber angle of each of the optical recording medium samples Nos. 1 to 8 at 75° C. higher than the highest temperature, i.e., 74.7° C.

If the camber of the optical recording medium is 0.35 deg or more, it is recognized that the data recording and reproducing characteristics of the optical recording medium are degraded. Accordingly, it was found that when the light transmission layer was formed by the ultraviolet curable resin having the elastic modulus of 170 MPa or more at 75° C. after curing, the camber angle became too large to degrade the data recording and reproducing characteristics of the optical recording medium. On the other hand, it was found that when the light transmission layer was formed by the ultraviolet curable resin having the elastic modulus of less than 170 MPa at 75° C. after curing, the camber angle did not degrade the data recording and reproducing characteristics of the optical recording medium.

Examples 1 and 2 revealed that when the optical recording medium has the light transmission layer formed by the ultraviolet curable resin having the elastic modulus of 51 MPa or more and less than 170 MPa at 75° C. after curing, in particular, the ultraviolet curable resin having the elastic modulus of 51 MPa or more and 154 MPa or less at 75° C. after curing, the optical recording medium has good recording and reproducing characteristics even if the ambient temperature is changed and is prevented from warping even if it is stored in a high temperature environment.

The present invention is not limited to the above-described embodiments and examples, variations and modifications may be made within the scope of the claimed invention, and it should be appreciated that they are also involved in the present invention.

For example, in the above-described embodiments and examples, the hard coat layer 15 is formed on the surface of the light transmission layer 14. However, the hard coat layer 15 is not necessarily formed on the surface of the light transmission layer 14.

The invention claimed is:

1. An optical recording medium, comprising a substrate on which at least a reflective layer that reflects light with a wavelength of 350 nm to 500 nm, a recording layer formed by an organic dye that absorbs light with a wavelength of 350 nm to 500 nm, and a single-layered light transmission layer that transmits light with a wavelength of 350 nm to 500 nm are laminated, characterized in that the light transmission layer includes a photocurable resin having an elastic modulus of 50 MPa or more and less than 170 MPa at 75° C., and the recording layer is formed by an azo metal complex dye including divalent nickel and a nitrogen-containing aromatic heterocyclic ring having a triazol structure.

2. The optical recording medium according to claim 1, characterized in that the single-layered light transmission layer is formed by coating the photocurable resin to form a coated film, irradiating a light and curing the coated film, the photocurable resin having elastic modulus of 51 MPa or more and 154 MPa or less at 75° C. after curing.

3. The optical recording medium according to claim 2, characterized in that the photocurable resin used for forming the single-layered light transmission layer is an ultraviolet curable resin which is cured by irradiating ultraviolet rays.

4. The optical recording medium according to claim 1, characterized in that the recording layer is formed by an azo metal complex dye represented by the following structural formula (10):

[Chemical formula 2]

Structural formula (10)

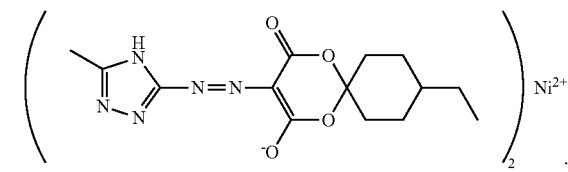

* * * * *